73-12 SR
7/1/86 OR H 000,086

United States Statutory Invention Registration [19]

[11] Reg. Number: H86

Kingery et al. [45] Published: Jul. 1, 1986

[54] ARRANGEMENT FOR COUNTERACTING SHOCK TUBE RAREFACTION WAVES

[75] Inventors: Charles N. Kingery, Aberdeen; George A. Coulter, Colora, both of Md.

[73] Assignee: The United States of America as represented by the Secretary of the Army, Washington, D.C.

[21] Appl. No.: 751,100

[22] Filed: Jul. 2, 1985

[51] Int. Cl.[4] ..... G01N 3/30

[52] U.S. Cl. ..... 73/12; 73/147

*Primary Examiner*—S. C. Buczinski
*Assistant Examiner*—Linda J. Wallace
*Attorney, Agent, or Firm*—Anthony T. Lane; Harold H. Card, Jr.; Michael C. Sachs

[57] ABSTRACT

An improved shock tube generates a reflected wave of an adjustable magnitude which arrives at a test object located within the shock tube at the same time that a rarefaction wave arrives so as to cancel the rarefaction wave thereat and counteract the undesirable effects of the rarefaction wave, thereby achieving a reliable free-field simulation.

8 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ARRANGEMENT FOR COUNTERACTING SHOCK TUBE RAREFACTION WAVES

STATEMENT OF GOVERNMENT INTEREST

This invention can be practiced by the government of the United States of America without payment to us of any royalties.

BACKGROUND OF THE INVENTION

1. Field of the Invention

This invention generally relates to the operation of shock tubes for simulating free-field conditions at a test object and, more particularly, to an arrangement for counteracting, if not totally eliminating, the undesirable effects of a rarefaction wave on the test object.

2. Description of the Prior Art

A shock tube can be employed for determining the effects of an air blast on a test object located within the shock tube. A shock wave is generated with the driver section of the tube and, thereupon, the test object which is located within the test section of the tube, is subjected to the blast. The shock wave impinges on and travels past the test object in a downstream path along the shock tube toward and beyond the discharge or open end of the shock tube. As the shock wave expands out of the discharge end, a rarefaction wave is generated which travels away from the discharge end into and along the shock tube in a countercurrent upstream direction along the path to the test object. The rarefaction wave generates an underpressure or reduced pressure zone in the circumambient region of the test object.

When the effects of very large air blasts, for example, those caused by nuclear or non-nuclear supertonnage explosions, are to be investigated for a test object, one could utiize huge cylindrical shock tubes which are very long, e.g. on the order of 500 ft., and which are very wide, e.g. on the order of 8 ft. or more in diameter. Such huge shock tubes are, of course, very expensive to manufacture and even more expensive to install at a test site. Hence, it has also been proposed to employ shock tubes of reduced length to minimize such manufacturing and installation expenses. However, it has been found that the shorter the test section of the shock tube, the greater the magnitude and the effect of the rarefaction wave on the test object—a condition which unfortunately is undesirable since the presence of the rarefaction wave tends to destroy the free-field simulation.

More particularly, the presence of the rarefaction wave lowers the pressure in the circumambient region of the test object. In an ideal free-field simulation, the pressure condition or pressure curve at the test object rises abruptly to a maximum pressure value and thereupon decays smoothly at a predetermined rate to a zero pressure value. However, the rarefaction wave, which creates an underpressure at the test object, disturbs the aforementioned ideal pressure curve and, when the rarefaction wave arrives at the test object, the pressure at the test station can, in some cases, have a negative value. In addition, the rarefaction wave acts to increase the air flow upstream of the test object so that the flow or drag effect of the shock wave on the test object is greater than what was intended.

In an earlier attempt to eliminate the effect of the rarefaction wave, one method employed was to mount a flat, solid plate at, but slightly offset from, the discharge end of the shock tube. The solid plate generated a reflected wave which traveled into and along the shock tube toward the test object. However, there was little control over the magnitude of the reflected wave and/or the time when the reflected wave reached the test object. Hence, the rarefaction wave was not cancelled and, in fact, matters were made somewhat worse, inasmuch as now the pressure curve at the test object showed a sharp pressure jump when the reflected wave arrived at the test object.

Other approaches included the use of vented plates, perforated plates with absorbent material, solid plates with absorbent material, and single rows of bars. All of these approaches, however, are limited to the pressure range over which they can operate efficiently. Further, none of these approaches provide any adjustable control over the magnitude of the reflected wave and/or the time when the reflected wave reaches the test object.

SUMMARY OF THE INVENTION

1. Objects of the Invention

It is a general object of the present invention to overcome the aforementioned drawbacks for such shock tubes.

It is an additional object of this invention to counteract, if not totally eliminate, the rarefaction wave and its effects on a test object in a shock tube.

It is a further object of this invention to reliably produce a true free-field simulation, even for a reduced scale shock tube.

It is another object of this invention to produce an arrangement for counteracting rarefaction waves which is inexpensive to manufacture, easy to install, reliable in operation, and which is operable over a broad pressure range.

2. Features of the Invention

In keeping with these objects and others which will become apparent, one feature of the invention, briefly stated, is an improved free-field simulator for determining the effects of an air blast on a test object located within a shock tube of the type wherein a shock wave travels past the test object in a path along the shock tube toward and beyond a discharge end of the same, and a rarefaction wave travels away from the discharge end into and along the shock tube in a countercurrent direction along the path to the test object. The rarefaction wave has an underpressure magnitude of one sense, i.e. the rarefaction wave generates a negative or reduced pressure condition in the circumambient region of the test object.

In accordance with this invention, means are provided for generating a reflected wave and for directing the same along the countercurrent direction of the path to the test object, and adjustment means for adjusting the magnitude of the reflected wave to have an overpressure magnitude which is substantially of the same magnitude as the underpressure magnitude of the rarefaction wave, but of an opposite sense. In other words, the reflected wave has a positive pressure of the same magnitude as the aforementioned reduced pressure, so that in the event the reflected wave reaches the test object at the same time that the rarefaction wave arrives at the test object, the reflected wave will counter and tend to cancel the rarefaction wave.

For this purpose, the invention further comprises timing means for adjustably timing the reflected wave to arrive at the test object at substantially the same time that the rarefaction wave arrives there. Thus, a free-field condition is reliably simulated in the circumambient region of the test object due to the counteraction between the reflected wave and the rarefaction wave.

In a preferred embodiment, a plurality of mutually spaced-apart bars are mounted exteriorly and extend transversely across the discharge end of the shock tube. These bars have respective reflection surfaces which are together operative for generating the reflected wave. The greater the number of bars that are so mounted, the greater the overpressure magnitude of the reflected wave. Thus, by controlling the number of such mounted bars, the magnitude of the reflected wave is controlled.

In the same preferred embodiment, it is also desirable to constitute the timing means as a spacing element mounted on the discharge end of the shock tube between the discharge end and the bars for maintaining the latter at a selected fixed spacing from the discharge end. The length of the spacing element is selected such that the reflected wave arrives at the test object at the same time that the rarefaction wave arrives there. The reflected wave travels much quicker than the rarefaction wave and, thus, even though the reflected wave must travel a greater distance than the rarefaction wave, the speed of the reflected wave is sufficient to overtake the rarefaction wave.

In further accordance with this invention, another plurality of mutually spaced-apart bars are mounted exteriorly of and extend transversely across the discharge end of the shock tube. This other plurality of bars is maintained by another spacing element at a different selected fixed spacing from the discharge end. The two pluralities of bars which are spaced at different distances from the discharge end generate a first and a second reflected wave which cooperate with each other and tend to counter a primary and a secondary rarefaction wave which are traveling toward the test object. The adjustability of the magntiude and the timing of the reflected waves are sufficient to cancel the primary and the secondary rarefaction waves over a broad range of shock waves and for a broad range of different positions of the test object within the test section of the shock tube. The arrangement for eliminating the rarefaction wave within the shock tube is thus easy to adjust, and can be manufactured for huge shock tubes as well as shock tubes of reduced scale.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 2:
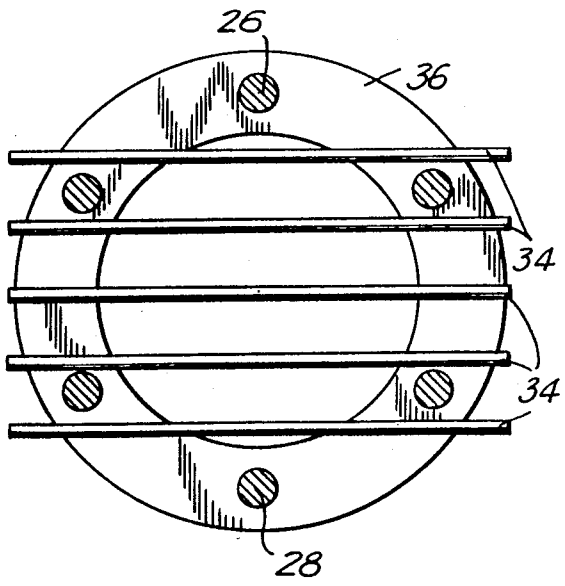
FIG. 2 is a sectional view as taken along line 2—2 of FIG. 1.

Referring now to the drawings, reference numeral 10 generally identifies an improved free-field simulator which includes a cylindrical shock tube 12 having a discharge or muzzle end 14. The shock tube 12 has a driver section 16 in which an air blast is generated, and a testing section 18 in which a test object 20 is located for exposure to the air blast. In an exemplificative embodiment, a source of compressed gas is located within or in communication with the driving section 16. Thereupon, the gas is suddenly released through a nonillustrated fast-opening valve into the testing section 18 in order to subject the test object 20 therein to the air blast. It will be understood that other means of generating an air blast are also within the spirit of this invention.

As a result of the air blast, a shock wave impinges on and travels past the test object in a path along the shock tube 12 toward and beyond the discharge end 14. As the shock wave expands out of the discharge end 14, a rarefaction wave is generated which travels away from the discharge end 14 into and along the shock tube 12 in a countercurrent direction along the path to the test object 20. The rarefaction wave generates a negative underpressure in the circumambient region of the test object. As noted above, it is a principal object of this invention to counter the undesirable effects of this rarefaction wave in the region of the test object.

To accomplish this, a first control subassembly 22 and, if desired for more control, a second control subassembly 24, are fixedly mounted outwardly of the discharge end 14 in an axial direction by means of threaded fasteners or bolts, e.g. 26, 28, which pass with clearance through subassemblies 24, 22 and thread into respective threaded holes, e.g. 30, 32, formed in the discharge end 14. Subassembly 22 comprises a plurality of elongated bars, each of which is identified by reference numeral 34, sandwiched and clamped between a pair of mounting rings 36, 38. Each ring 36, 38 has a plurality of clearance openings equiangularly arranged in an annulus, and the stems of the aforementioned bolts pass through such openings. The bars 34 are spaced apart in a mutual parallelism, and bound spaces therebetween. The bars 34 are preferably circular in cross-section, although different cross-sectional shapes are also within the spirit of this invention. The bars 34 extend across the open discharge end 14, and have outer reflection surfaces which partially block the open discharge end. The number of such bars 34 and the sizes of the outer reflection surfaces are selectable for the purpose described below.

In addition, the subassembly 22 further comprises an annular spacing element or a plurality of spacers, each identified by the reference numeral 40, mounted between the discharge end 14 and the mounting ring 36. Each spacer 40 has an opening, all openings being equiangularly spaced apart, which, in the mounted position, are in registry with the clearance openings in the rings 36, 38 so as to permit the stems of the aforementioned bolts to pass therethrough with clearance. Each spacer 40 has a length as considered in the axial direction, and the dimension of this length is selectable for the purpose described below.

In analogous manner, control subassembly 24 comprises a plurality of elongated bars, each of which is identified by the reference numeral 42. The bars are sandwiched and clamped between a pair of mounting rings 44, 46. Each ring 44, 46 has a plurality of clearance openings equiangularly arranged in an annulus and through which the stems of the aforementioned bolts pass with clearance. The clearance openings in the mounting rings 44, 46 are, of course, in registry with their counterparts in rings 36, 38. The bars 42 are spaced apart in a mutual parallelism, and bound spaces therebetween. The bars 42 extend across the open discharge end, albeit at a further distance from the discharge end 14 as compared to that of the bars 34, and also have outer reflection surfaces which partially block the open discharge end 14. As described previously for bars 34, the number of the bars 42 and the sizes of the outer reflection surfaces of bars 42 are selectable for the purpose described below.

In addition, control subassembly 24 further comprises an annular covered spacing element or spacer 48 mounted between mounting rings 38, 44. Spacer 48 has a corresponding plurality of equiangularly spaced-apart openings which, in the mounted position, are in registry with the clearance openings of the rings 44, 46. Spacer 48 has a length as considered in the axial direction, which length dimension is selectable for the purpose described below.

Figure 1:
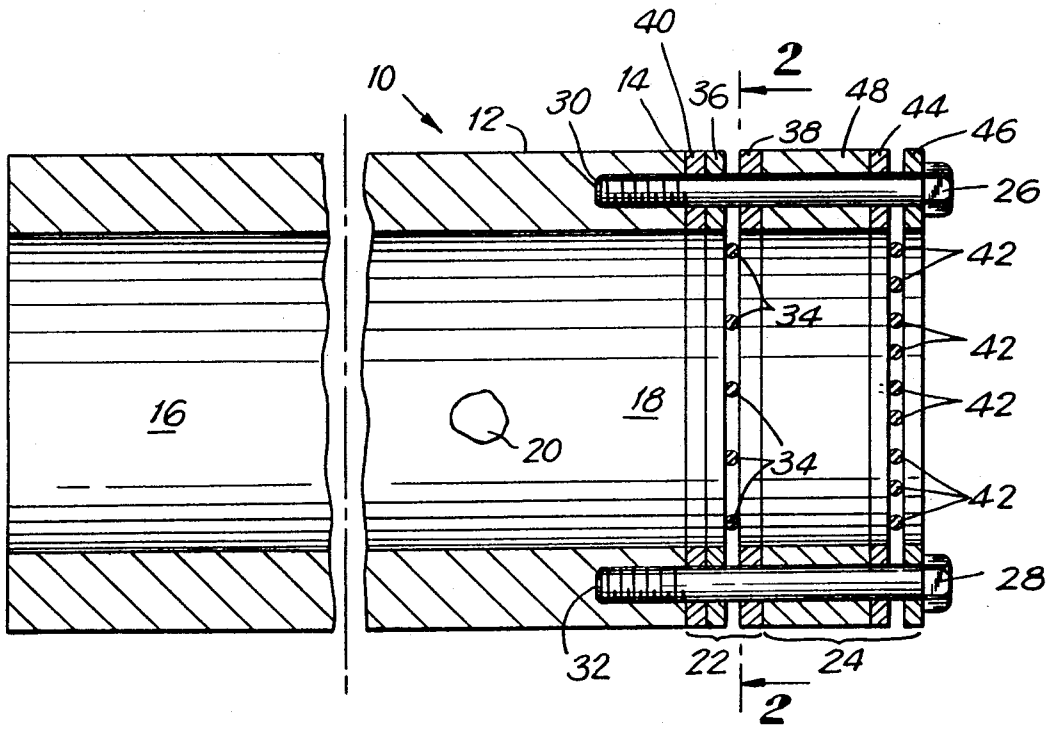
FIG. 1 is a partially broken-away cross-sectional view of a shock tube at the discharge end of which is mounted an arrangement for eliminating rarefaction waves therein.

In operation, when an air blast occurs within the shock tube, a shock wave travels past the test object in a path along the same toward and beyond the discharge end 14 in a direction which, in FIG. 1, extends from left to right. As the shock wave expands out of the discharge end 14 and past the open spaces between bars 34, a rarefaction wave is generated, the rarefaction wave traveling away from the bars 34 into the discharge end 14 and axially along the shock tube 12 in a countercurrent direction, e.g. from right to left in FIG. 1, along the path to the test object 20.

To cancel this rarefaction wave and thus counteract its undesired effects, the aforementioned outer reflection surfaces of the bars 34 are together operative for reflecting at least a portion of the shock wave back into and along the shock tube, so that the resultant reflected wave travels in the same countercurrent direction, e.g. from right to left in FIG. 1, as the rarefaction wave.

Now in accordance with this invention, the magnitude and the arrival time of the reflected wave at the test object are adjusted. More particularly, by selecting the number of bars 34 and the sizes of their outer reflection surfaces, the magnitude of the reflected wave is controlled. The greater the number of bars 34 and the greater the cross-section of the bars, the larger the magnitude of the reflected wave. The magnitude of the reflected wave is a positive pressure, and is so controlled that it equals, or at least substantially equals, the magnitude of the rarefaction wave which is a negative pressure.

In addition, the reflected wave must arrive at the test object at the same time, or at least substantially the same time, as the time that the rarefaction wave arrives there. Despite the fact that the reflected wave is generated at a greater distance from the test object than the rarefaction wave, the reflected wave is faster and, in fact, overtakes the rarefaction wave. The arrival time is adjusted by selecting the aforementioned length of the spacer 40. The shorter said length, the sooner the reflected wave will arrive at the test object. Thus, by controlling these two parameters, namely, the magnitude and the arrival time of the reflected wave, the effects of the rarefaction wave tend to be counteracted, and a true free field is reliably simulated in the circumambient region of the test object.

For even finer control, the second control subassembly assembly 24 operates in an essentially analogous manner. Thus, as the shock wave continues its outward travel past the subassembly 22 and travels through and past the open spaces bounded by the bars 42, another rarefaction wave is returned toward the test object. For ease of description, this other rarefaction wave will be called a secondary rarefaction wave, and the first-mentioned rarefaction wave will be called a primary rarefaction wave. The outer reflection surfaces of the bars 42 are together operative for returning another reflected wave toward the test object and, for ease of description, this other reflected wave will hereinafter be called a second reflected wave, whereas the first-mentioned reflected wave will hereinafter be called the first reflected wave.

An interaction occurs between the secondary and primary rarefaction waves and the second and first reflection waves in that the returning secondary rarefaction wave and the second reflected wave must pass through the open spaces between the bars 34 en route to the test object, and this causes multiple reflected and rarefaction waves. However, these multiple reflected and rarefaction waves are minor disturbances, and it has been found that such interaction does not unduly disturb the simulation. Thus, by controlling the number and the sizes of the outer reflection surfaces of the bars 34 and/or the bars 42, as well as by controlling the length of each spacer 40 and/or the spacer 48, both the primary and secondary rarefaction waves can be cancelled by the aformentioned control over the magnitudes and the arrival times of the first and second reflected waves.

For still greater control, it has been found that the orientation of the bars 42 relative to the bars 34 may also be adjusted. As shown in the drawings, the bars 42 extend in a direction parallel to the elongation of the bars 34, and this has been found to be quite satisfactory. However, the bars 42 can also be mounted such that they extend in a direction perpendicular to the elongation of the bars 34 and, in a preferred embodiment, the bars 42 extend at an inclined angle of about 45° relative to the elongation of the bars 34. The orientation of the bars 42 relative to that of the bars 34 is easily adjustable by rotating the rings 44, 46 between which the bars 42 are clamped by initially removing the aformentioned bolts and thereupon inserting their stems in different clearance openings in the rings 44, 46.

This invention has been tested on a shock tube having an inside diameter of 5.08 cm, the mounting rings 36, 38, 44, 46 and the spacer 48 also having said same inside diameter. Each of the spacers 40 which, incidentally, could be replaced by a single annular spacer analogous to spacer 48, has an inside diameter of 0.635 cm and an outside diameter of 1.06 cm. The spacer 48 and each mounting ring 36, 38, 44, 46 have an outside diameter of 7.62 cm. The mounting bolts are each 5.08 inches in length, 1/4-20 National Course Thread.

The length of each spacer 40 ranges, in a preferred embodiment and operating range, from 0.229 cm to 1.52 cm. The length of the covered spacer 48, in the preferred embodiment, is approximately 1.65 cm. Similarly, it has been found that, in the preferred embodiment, the number of bars 34 can range anywhere from four to six in number, with four bars 34 being the most preferred. As for the bars 42, they can range in number from six to fourteen, with eight bars being the preferred quantity. The cross-section of the bars is preferably circular, and each bar has a diameter of 0.254 cm and a length of about 7.26 cm.

The simulator in accordance with this invention will operate over a pressure range from 20 kPa to about 200 kPa.

The aforementioned test arrangement resulted in a pressure reading at the test object which rose abruptly at about 0.25 milliseconds after commencement of the air blast to about 50 kPa, and thereupon decayed smoothly toward zero and reached zero pressure in about four milliseconds from the commencement of the air blast.

This invention was also tested on a shock tube having an inside diamater of 57 cm. In other words, this second test arrangement was increased by a scale factor of 11.25 from the first test arrangement. This design would also be operative on a shock tube having an inside diameter of fourteen meters as long as all linear dimensions are scaled upwardly by a factor of 24.6. There is no known limit to the size at which the invention can be constructed and operated.

It will be understood that each of the elements described above, or two or more together, also may find a useful application in other types of constructions differing from the types described above.

While the invention has been illustrated and described as embodied in an arrangement for counteracting shock tube rarefaction waves, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A free-field simulator for determining the effects of an air blast on a test object located within a shock tube of the type wherein a shock wave travels past the test object in a path along the shock tube toward and beyond a discharge end of the same, and a rarefaction wave travels away from the discharge end into and along the shock tube in a countercurrent direction along the path to the test object, said rarefaction wave having an underpressure magnitude of one sense, comprising:

means for generating a reflected wave and for directing the same along the countercurrent direction of the path to the test object, said generating means including adjustment means for adjusting the magnitude of the reflected wave to have an overpressure magnitude which is substantially of the same magnitude as the underpressure magnitude of the rarefaction wave, but of an opposite sense; and timing means for adjustably timing the reflected wave to arrive at the test object at substantially the same time that the rarefaction wave arrives thereat, for causing the reflected wave to tend to counteract the effects of the rarefaction wave in the circumambient region of the test object and reliably simulate a free field thereat.

2. The simulator is recited in claim 1, wherein the adjustment means includes a plurality of bars and means for mounting the same in a mutually spaced-apart relationship exteriorly of the discharge end of the shock tube, each bar having a reflection surface from which the reflected wave is generated, said overpressure magnitude being proportional to the number of bars so mounted.

3. The simulator as recited in claim 2, wherein the timing means includes a spacing element mounted on the discharge end of the sock tube, and operative for maintaining the bars at a selected fixed spacing from the discharge end, said arrival time of the reflected wave being proportional to the amount of said spacing.

4. The similator as recited in claim 2, wherein the means for mounting the bars includes a pair of mounting rings on opposite sides of the bars, and operative for clamping the bars between the mounting rings.

5. The simulator as recited in claim 1, wherein the adjustment means includes a first and a second plurality of bars, and means for separately mounting the first and the second plurality of bars, each plurality in a mutually spaced-apart relationship exteriorly of the discharge end of the shock tube; and wherein the timing means includes a first and a second spacing element mounted on the discharge end of the shock tube, each spacing element being operative for maintaining the first and the second plurality of bars at two different fixed spacings from the discharge end.

6. A free-field simulator for determining the effects of an air blast on a test object located within a shock tube of the type wherein a shock wave travels past the test object in a path along the shock tube toward and beyond a discharge end of the same, and a rarefaction wave travels away from the discharge end into and along the shock tube in a countercurrent direction along the path to the test object, said rarefaction wave having an underpressure magnitude of one sense, comprising:

a plurality of bars mounted in a mutually spaced-apart relationship exteriorly of and extending transversely across the discharge end of the shock tube, said bars having respective reflection surfaces together operative for generally a reflected wave and for directing it along the countercurrent direction of the path to the test object, the total number of said plurality of bars being selected such that the magnitude of the reflected wave has an overpressure magnitude which is substantially of the same magnitude as the underpressure magnitude of the rarefaction wave, but of an opposite sense; and a spacing element mounted on the discharge end of the shock tube between the shock tube and the bars for maintaining the bars at a selected fixed spacing from the discharge end, said spacing element having a length selected such that the reflected wave arrives at the test object at substantially the same time that the rarefaction wave arrives thereat, for causing the reflected wave to tend to counteract the effects of the rarefaction wave in the circumambient region of the test object and reliably simulate a free field thereat.

7. The simulator as recited in claim 6; and further comprising another plurality of bars mounted in a mutually spaced-apart relationship exteriorly of and extending transversely across the discharge end of the shock tube, and another spacing element spaced from the first-mentioned spacing element and operative for maintaining said other plurality of bars at a different selected fixed spacing from the discharge end.

8. A free-field simulator for determining the effects of an air blast on a test object located within a shock tube of the type wherein a shock wave travels past the test object in a path along the shock tube toward and beyond a discharge end of the shock tube, and a primary and a secondary rarefaction wave travel away from the discharge end into and along the shock tube in a countercurrent direction along the path to the test object, each rareaction wave having a different underpressure magnitude of one sense, comprising:

a first plurality of mutually spaced-apart bars mounted exteriorly of and extending transversely across the discharge end of the shock tube, said first plurality of bars having respective reflection surfaces together operative for generating a first reflected wave and for directing it along the countercurrent direction of the path to the test object, the total number of said first plurality of bars being selected such that the magnitude of the first reflected wave has a first overpressure magnitude which is substantially of the same magnitude as the underpressure magnitude of the primary rarefaction wave, but of an opposite sense;

a first spacing element mounted on the shock tube between the discharge end thereof and the first plurality of bars for maintaining the bars at a first selected fixed spacing from the discharge end, said first spacing element having a length selected such that the first reflected wave arrives at the test object at substantially the same time that the primary rarefaction wave arrives thereat, for causing the first reflected wave to tend to counteract the effects of the primary rarefaction wave in the circumambient region of the test object;

a second plurality of mutually spaced-apart bars mounted exteriorly of and extending transversely across the discharge end of the shock tube, said second plurality of bars having respective reflection surfaces together operative for generating a second reflected wave and for directing it along the countercurrent direction of the path to the test object, the total number of said second plurality of bars being selected such that the magnitude of the second reflected wave has a second overpressure magnitude which is substantially of the same magnitude as the underpressure magnitude of the secondary rarefaction wave, but of an opposite sense; and a second spacing element mounted on the shock tube between the discharge end thereof and the second plurality of bars for maintaining the latter at a second selected fixed spacing from the discharge end, said second spacing element having a length selected such that the second reflected wave arrives at the test object at substantially the same time that the secondary rarefaction wave arrives thereat, for causing the second reflected wave to tend to counteract the effects of the secondary rarefaction wave in the circumambient region of the test object, whereby a free field is reliably simulated.

* * * * *